(12) United States Patent
Katz et al.

(10) Patent No.: US 10,902,342 B2
(45) Date of Patent: *Jan. 26, 2021

(54) SYSTEM AND METHOD FOR SCORING THE GEOGRAPHIC RELEVANCE OF ANSWERS IN A DEEP QUESTION ANSWERING SYSTEM BASED ON GEOGRAPHIC CONTEXT OF AN INPUT QUESTION

(71) Applicant: International Business Machines Corporation, Armonk, NY (US)

(72) Inventors: Edward G. Katz, Washington, DC (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 669 days.

This patent is subject to a terminal disclaimer.

(21) Appl. No.: 15/267,553

(22) Filed: Sep. 16, 2016

(65) Prior Publication Data

US 2018/0082187 A1    Mar. 22, 2018

(51) Int. Cl.
| | | |
|---|---|---|
| G06N 20/00 | (2019.01) | |
| G06N 5/04 | (2006.01) | |
| G06F 16/33 | (2019.01) | |
| G06F 16/29 | (2019.01) | |

(52) U.S. Cl.
CPC ......... *G06N 20/00* (2019.01); *G06F 16/3344* (2019.01); *G06N 5/041* (2013.01)

(58) Field of Classification Search
CPC ......... G06F 16/29; G06F 16/334; G06N 3/08; G06N 5/04; G06N 20/00
See application file for complete search history.

(56) References Cited

U.S. PATENT DOCUMENTS

| | | | |
|---|---|---|---|
| 7,827,176 B2 * | 11/2010 | Korte ................. | G06Q 30/0256 707/733 |
| 8,015,183 B2 | 9/2011 | Frank | |
| 8,046,371 B2 | 10/2011 | O'Clair et al. | |
| 8,171,048 B2 | 5/2012 | Ge et al. | |
| 8,332,396 B1 * | 12/2012 | Srinivasaiah .......... | G06Q 30/02 707/723 |
| 9,400,780 B2 | 7/2016 | Clark et al. | |
| 9,430,461 B2 | 8/2016 | Baughman et al. | |
| 9,569,503 B2 | 2/2017 | Bagchi et al. | |
| 9,606,934 B2 | 3/2017 | Acar et al. | |
| 9,720,962 B2 | 8/2017 | Allen et al. | |
| 9,908,052 B2 | 3/2018 | Allen et al. | |

(Continued)

OTHER PUBLICATIONS

U.S. Appl. No. 15/267,568, filed Sep. 16, 2016.

(Continued)

*Primary Examiner* — Kamran Afshar
*Assistant Examiner* — Benjamin J Buss
(74) *Attorney, Agent, or Firm* — Terrile, Cannatti & Chambers, LLP; Michael Rocco Cannatti

(57) ABSTRACT

A method, system and a computer program product are provided for scoring candidate answers for geographic relevance analyzing an input question to identify one or more first geographic foci of the input question based on geographical contextual information associated with the input question, identifying one or more second geographic foci for a candidate answer generated in response to the input question, and then comparing the first and second geographic foci to generate a geographic relevance score for the candidate answer to the input question.

20 Claims, 4 Drawing Sheets

(56) References Cited

U.S. PATENT DOCUMENTS

| | | | |
|---|---|---|---|
| 10,073,833 B1 | 9/2018 | Beller et al. | |
| 10,325,026 B2 | 6/2019 | Cardillo | |
| 10,373,057 B2 | 8/2019 | Acar et al. | |
| 2008/0243783 A1* | 10/2008 | Santi | G06Q 30/0254 |
| 2011/0173066 A1* | 7/2011 | Simmons | G06Q 30/0251 |
| | | | 705/14.49 |
| 2011/0173150 A1 | 7/2011 | van Zwol et al. | |
| 2011/0307478 A1* | 12/2011 | Pinckney | G09B 7/04 |
| | | | 707/724 |
| 2013/0018652 A1 | 1/2013 | Ferrucci et al. | |
| 2013/0204868 A1* | 8/2013 | Singh | G06F 16/29 |
| | | | 707/724 |
| 2014/0006012 A1* | 1/2014 | Zhou | G06F 16/3344 |
| | | | 704/9 |
| 2014/0142922 A1 | 5/2014 | Liang et al. | |
| 2014/0330760 A1 | 11/2014 | Meier et al. | |
| 2015/0242420 A1* | 8/2015 | Glover | H04L 67/10 |
| | | | 707/724 |
| 2015/0347594 A1* | 12/2015 | Hornkvist | G06F 16/2457 |
| | | | 707/711 |
| 2015/0350852 A1* | 12/2015 | Mitchell, Jr. | H04W 4/021 |
| | | | 709/204 |
| 2015/0363428 A1* | 12/2015 | Strand | G06F 16/24578 |
| | | | 707/724 |
| 2015/0379017 A1* | 12/2015 | Seth | G06F 16/24575 |
| | | | 707/724 |
| 2015/0379028 A1* | 12/2015 | Bailly | G06F 16/838 |
| | | | 707/743 |
| 2016/0004723 A1* | 1/2016 | Pretel | G06F 16/29 |
| | | | 707/769 |
| 2016/0085773 A1* | 3/2016 | Chang | G06F 3/0484 |
| | | | 715/753 |
| 2016/0162946 A1* | 6/2016 | Delli Santi | G06Q 30/0254 |
| | | | 705/14.52 |
| 2016/0196349 A1* | 7/2016 | Berkhin | G06F 16/29 |
| | | | 707/706 |
| 2016/0205505 A1* | 7/2016 | Frazier | H04L 67/18 |
| | | | 455/456.3 |
| 2016/0260162 A1* | 9/2016 | Streich | G06F 16/444 |
| 2016/0321297 A1* | 11/2016 | Jurca | G06F 16/29 |
| 2017/0270421 A1* | 9/2017 | Frank | G06F 16/24578 |
| 2017/0364804 A1* | 12/2017 | Beller | G06N 5/04 |
| 2018/0081906 A1* | 3/2018 | Katz | G06F 16/3329 |

OTHER PUBLICATIONS

List of IBM Patents or Applications Treated as Related.

Chen, Wei, "Developing a Framework for Geographic Question Answering Systems Using GIS, Natural Language Processing, Machine Learning, and Ontologies" OSU dissertation, 2014 https://www.researchgate.net/publication/273122359_Developing_a_Framework_for_Geographic_Question_Answering_Systems_Using_GIS_Natural_Language_Processing_Machine_Learning_and_Ontologies.

Domenech, Daniel Ferres, "Geographical Information Resolution and its Application to the Question Answering Systems" dissertation UPC http://www.cs.upc.edu/~dferres/dea-dferres.pdf.

Perea-Ortega, Jose M. et al., "Applying NLP techniques for query reformulation to information retrieval with geographical references." Emerging Trends in Knowledge Discovery and Data Mining. Springer Berlin Heidelberg, 2012. 57-69. https://www.researchgate.net/publication/262290355_Applying_NLP_Techniques_for_Query_Reformulation_to_Information_Retrieval_with_Geographical_References.

Leidner, Jochen L. et al., "Detecting geographical references in the form of place names and associated spatial natural language." SIGSPATIAL Special 3.2 (2011): 5-11 www.cs.umd.edu/~codepoet/pubs/recognition-special.pdf.

Lally, Adam et al., "Question analysis: How Watson reads a clue." IBM Journal of Research and Development 56, No. 3.4 (2012): 2-1.

Chu-Carroll J., et al., "Finding needles in the haystack: Search and candidate generation." IBM Journal of Research and Development, 56 (3.4), 6-1, 2012.

Kalyanpur, Aditya, et al., "Structured data and inference in DeepQA." IBM Journal of Research and Development 56, No. 3.4 (2012): 10-1.

Murdock, J. William et al., "Textual evidence gathering and analysis." IBM Journal of Research and Development 56, No. 34 (2012): 8-1.

Wang, Chang et al., "Relation extraction and scoring in DeepQA." IBM Journal of Research and Development 56, No. 3.4 (2012): 9-1.

Prager, John M. et al., "Special questions and techniques." IBM Journal of Research and Development 56, No. 3.4 (2012): 11-1.

High, Rob, "The Era of Cognitive Systems: An Inside Look at IBM Watson and How it Works," IBM Redbooks, 2012.

Yuan, Michael, "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Charles E. Beller et al., U.S. Appl. No. 15/214,529, filed Jul. 20, 2016, entitled Evaluating Temporal Relevance in Question Answering.

Leidner, Jochen L. et al., Grounding spatial named entities for information extraction and question answering, pp. 31-38, NAACL 2003, http://kornai.com/NAACL/WS9/ws908.pdf.

Speriosu, Michael et al., Connecting Language and Geography with Region-Topic Models, 2010, http://ceur-ws.org/Vol-620/paper5.pdf.

* cited by examiner

SYSTEM AND METHOD FOR SCORING THE GEOGRAPHIC RELEVANCE OF ANSWERS IN A DEEP QUESTION ANSWERING SYSTEM BASED ON GEOGRAPHIC CONTEXT OF AN INPUT QUESTION

This invention was made with United States Government support under Agreement No. 2013-12101100008. THE GOVERNMENT HAS CERTAIN RIGHTS IN THE INVENTION.

BACKGROUND OF THE INVENTION

Field of the Invention

The present invention is directed in general to the field of improved data processing apparatus, system, and method of operation. In one aspect, the present invention relates to an information handling system, method, and apparatus for evaluating the geographical relevance of answers in a Question Answering (QA) system.

Description of the Related Art

In the field of artificially intelligent computer systems capable of answering questions posed in natural language, cognitive question answering (QA) systems process questions posed in natural language to determine answers and associated confidence scores based on knowledge acquired by the QA system. Examples, of QA systems are Siri® from Apple®, Cortana® from Microsoft®, the IBM Watson™ artificially intelligent question answering computer system available from International Business Machines (IBM®) Corporation of Armonk, N.Y., or and other natural language question answering systems. The IBM Watson™ system is an application of advanced natural language processing, information retrieval, knowledge representation and reasoning, and machine learning technologies to the field of open domain question answering. The IBM Watson™ system uses a deep question answering technology for hypothesis generation, massive evidence gathering, analysis, and scoring. To generate answer candidates from an input question, the deep QA system takes an input question, analyzes it, and decomposes the question into constituent parts. In addition, the deep QA system extracts likely answers, in the form of words and short phrases, from documents in a document collection or database(s) which are scored and ranked to generate one or more hypothesis based on the decomposed question and results of a primary search of answer sources. After performing hypothesis and evidence scoring based on a retrieval of evidence from evidence sources, the deep QA system performs synthesis of the one or more hypothesis, and based on trained models, performs a final merging and ranking to output one or more top ranked answers to the input question along with a confidence measure(s). As will be appreciated, when questions posed to a deep question answering system have geographical information in the question, ignoring this information is a large source of errors. For example, a request for information about goods manufactured in one region may produce an incorrect answer about similar or identical goods manufactured in another if the generated answer does not take into account the geographic focus of the question. It follows that the accuracy of the answers depends on the ability to recognize the geographic information contained in the question and in candidate answers generated in response thereto. However and as explained below, it is a non-trivial matter to identify geographic information in answer candidates and accurately match those to questions which include corresponding geographic information. As a result, the existing solutions for efficiently generating correct answers in response to questions containing geographic information are extremely difficult at a practical level.

SUMMARY

Broadly speaking, selected embodiments of the present disclosure provide a system, method, and apparatus for evaluating the geographic relevance of an answer candidate to an input question containing geographic information based on the relationship between the geographic focus of the question and the geographic focus of the answer candidate. In selected embodiments, the system, method, and apparatus are embodied in a Question Answering (QA) system which receives and analyzes an input natural language question to identify a geographic focus of the input natural language question. The geographic focus for the question may be derived by identifying and resolving all definite locative expressions in the question with respect to any identified contextual location for the question, such as the location of the user submitting the question or the location of primary interest in the user's profile. In addition, the QA system processes a corpus of documents based on the input natural language question to generate candidate answers to the input natural language question from one or more corpus documents and to evaluate each candidate answer to identify at least one geographic focus associated with the candidate answer. As will be appreciated, a candidate answer may be generated from any document in any corpus so that multiple candidate answers may be generated from any document in any corpus, and as identical candidate answers are merged, the final representation of a candidate answer that gets scored may have come from multiple corpus documents. In selected embodiments, a candidate answer may be scored for its geographic relevance by computing a geographic focus based on specified document location data characterizing a document that is the basis for a candidate answer. One type of specified document location data is the document context location, such as a publication location of the document, a known focus of the location for the source of the document, the creation location of the document, the location where the document was ingested, or other appropriate document-relevance location information. A second type of specified document location data is any definite locative expression (e.g., a short phrase, such as "USA," "Chicago," "here," etc.) contained in the document that may be normalized references to specific geographical locations. By comparing the at least one geographic focus associated with the candidate answer with the geographic focus for the input natural language question, the QA system generates a measure of geographic relevance of the candidate answer based on results of the comparison, thereby improving the accuracy of answers by making use of location information throughout a document. Additionally, the QA system may output a final answer to the input natural language question based on the measure of geographic relevance.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
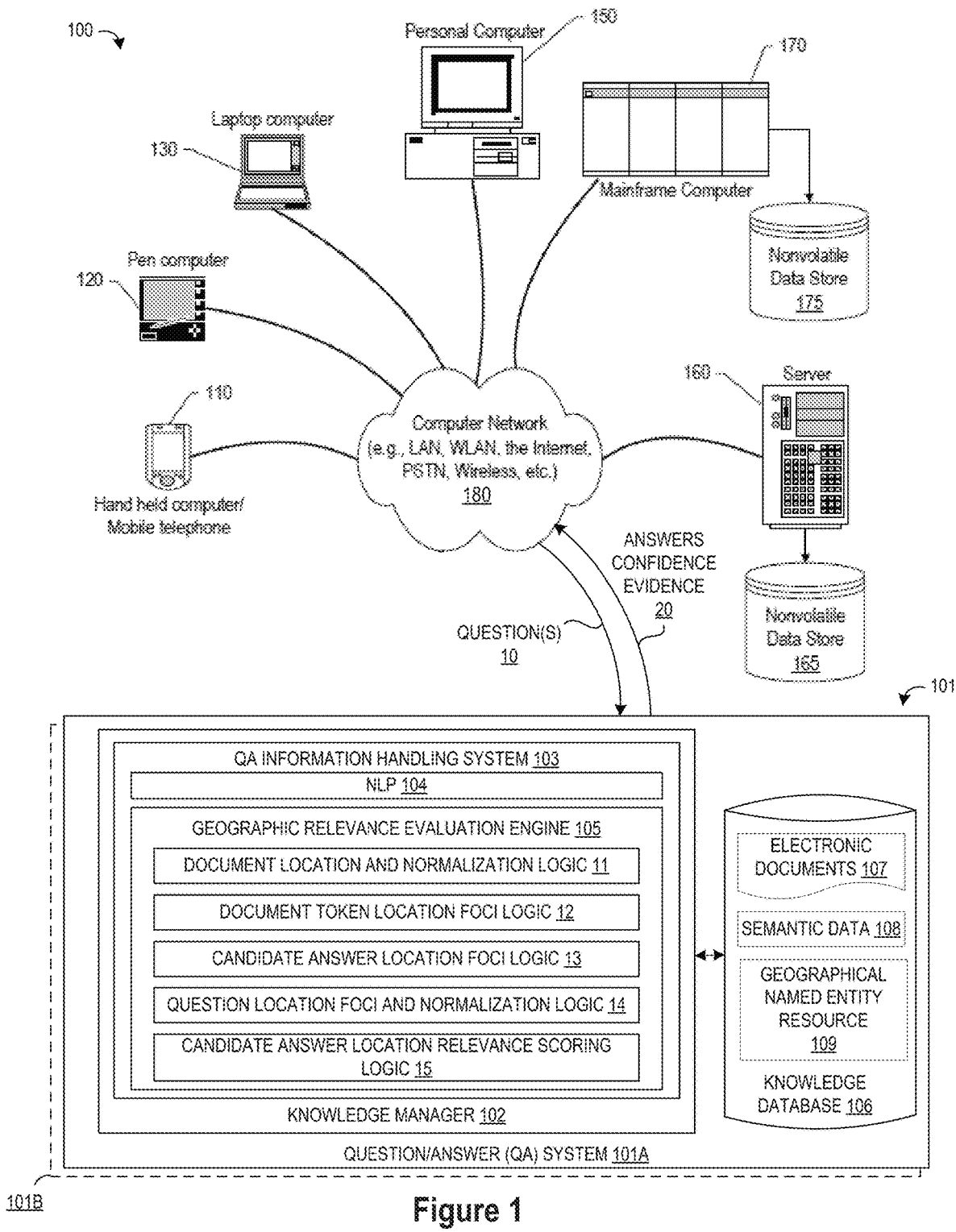
FIG. 1 depicts a system diagram that includes a QA system connected in a network environment to a computing system that uses a geographic relevance evaluation engine to evaluate the geographic relevance of an answer candidate.

The illustrative embodiments provide mechanisms for evaluating the geographic relevance of candidate answers in a question answering (QA) system. In particular, the illustrative embodiments provide mechanisms for scoring the geographic relevance of information provided in an input question to geographic information present in association with candidate answers in one or more documents of a corpus of documents for purposes of identifying candidate answers that are more geographically relevant to the input question than others.

In question answering systems which generate answer candidates for a question, likely answers in the form of words and short phrases are extracted from a corpus of documents. These candidate answers are scored and ranked with top ranked answers being returned to the user as answers to the original question. Many questions contain geographic information which is crucial to providing a correct answer. For example, to correctly answer the question, "Which groups are fighting in Michoacán?", answers which talk about conflict and control in Michoacán should be ranked above those that talk about conflict and control in Venezuela. or other regions of Mexico, even if the text describing other regions contains clearer statements of identity or of the conflict. More generally, the relationship between the geographic focus of the question and the geographic focus (defined below) of the answer candidate is crucial to ranking.

For example, consider the following passage: "The 'self-defense groups' seized several small towns in the western state of Michoacán over the past week. They say they are fighting for the freedom of their communities from the notorious Knights Templar cartel." To determine that the geographic focus of the answer candidate "Knights Templar" is Michoacán requires a method of processing the entire passage. In many other cases, information may be needed at the level of the entire document. As an example of this latter case, consider the following content:

La Jornada Michoacán
Police picket Government House
A group of policemen is, right now, demonstrating outside Government House.
The protesters demand the payment of several fortnights' back pay and say that it has taken weeks and they have not received a reply; therefore, they placed banners and are still here.
They marched from police and transit facilities where they held a demonstration.
So far there have been no closed roads.

To determine the geographic focus of this candidate answer as being "Michoacán" requires mechanisms that can process the entire passage and identify the source identification at the start, which establishes the regional context of Michoacán. In addition a mechanism is required to evaluate an answer candidate based on the relationship between the geographic focus of the candidate answer and the geographic focus of the question. The illustrative embodiments provide such mechanisms for evaluating geographic foci when generating answers to input questions via a cognitive system.

Within the context of the present description, the "geographic focus" of a text refers to the definite geographical region which the text is about. For example, in "Bill Clinton was president of the USA in 1995" the geographical focus is "USA".

In addition, the "definite locative expression" is a short phrase ("USA" "Chicago" "here") that refers to a specific geographical location. Geographic locations are typically listed in a gazetteer of locations, which specifies the geometric relations among the locations (such as inclusion) as well as providing other relevant information coordinates, populations, etc.)

A "corpus" or "document corpus" or "corpus of documents" or "document collection" refers to a set of documents which have been ingested into a cognitive system, potentially over a protracted period of time. These documents may have associated with them meta-data concerning where they are published, or the source of the document that has implicit geographical information. At a minimum, the document will have associated with it a location from which the document was sourced or ingested.

The term "document" refers to any portion of content which is stored in an electronic form. A document may range from a few characters, words, or terms, to sentences, paragraphs, pages, collections of pages, and so on. A document may comprise textual and non-textual content including images, video, audio content, or the like. The document may be stored in any electronic form but in general will be stored as a portion of data which may have associated metadata.

A "location-non-monotonic" question refers to a question that requires an answer for a location that matches its geographic focus precisely. For example, a question about the population of a city requires an answer that applies to that city, not the country in which it is located or a district within the city.

A "location-upward-monotonic" question refers to a question that specifies a region to which the answer may apply by inclusion. For example, a question about an incident occurring in a country may be answered with information that describes the incident in terms of its occurrence in a city within that country; in this case, the answer's geographic focus is included within the question's geographic focus.

As noted above, one aspect of a candidate answer's correctness for answering an input question is to evaluate the geographic relevance of the answer, such as by matching the geographic focus of the input question to the geographic focus of the text from which the answer is extracted, also referred to herein as the contextual geographic or location focus of the candidate answer. In order to appropriately score candidate answers for their geographic relevance, each candidate answer extracted from a text has its contextual geographic focus determined using the mechanisms of the illustrative embodiments disclosed herein. In selected embodiments, scoring of answers for geographic relevance involves computing geographic focus for each answer candidate extracted from a text. The determination of a contextual geographic focus can be quite difficult since, as illustrated by the example given above, the contextual geographic focus of a candidate answer can be indicated by textual content which is quite distant from the text in which the candidate answer is present.

In accordance with one illustrative embodiment, in order to determine the contextual geographic focus of a candidate answer, the mechanisms of the illustrative embodiment first identify an appropriate document relevance location information, such as a location of publication, ingestion location, a known focus location for the source of the document, the creation location of the document, the location of ingestion of the document, or the like, for the document. This operation may have been done prior to processing the input question, such as part of an ingestion operation or may be done as part of the processing of an input question and may be directed to a document in which the candidate answer was found, or from which it was extracted. This operation may comprise analyzing metadata associated with the document to extract location information that is associated with the document and then select one, if there is more than one, which is most appropriate for use as a document relevance location. It should be appreciated that if there is more than one location associated with the document, a priority or preference ordering of locations may be established for selecting a location from those available. For example, a preference ordering may be established, such as via configuration information that prioritizes a publication location of the document over a known focus location for the document source, which is further prioritized over a creation location of the document, which is further prioritized over an ingestion location of the document.

In addition, the mechanisms of this illustrative embodiment may normalize all the definite locative expressions in the document by associating a location from a gazetteer with each such expression. In other words, each locative expression is associated with a reference location that is specified in an absolute location and uniform format such that locative expressions may be accurately compared. As with the determination of the document relevance location, this operation may be performed as part of an ingestion operation when ingesting a document from a corpus, or may be performed as part of the processing of an input question.

The mechanisms of this illustrative embodiment may also associate each token in the document (e.g., word or group of alphanumeric characters) with one or more geographic foci, making use of the document relevance location information and the normalized locative expressions associated with the portion of text in which the token is present or which is closest to the token from the standpoint of distance measured as a number of tokens e.g., words), as well as considering other characteristics of the token and surrounding text including syntactic structure, matching verb tense between token and text corresponding to normalized locative expressions, and the like. Again, these operations may be performed either at a time of ingestion of the document or as part of processing an input question.

Independently of the candidate answer processing mechanisms described hereinabove, question processing mechanisms of the illustrative embodiments determine one or more geographic foci of the input question. The identification of the one or more geographic foci may comprise using the user's current location or a location of primary interest in the user's profile, as a relevant contextual location for the input question. The mechanisms may then identify and normalize all definite locative expressions in the question with respect to this relevant contextual location, e.g., if the question asks about restaurants located "downtown" and the relevant contextual location of the question is resolved with reference to the user's current location in Austin Tex., then "downtown" would be referring to restaurants located "downtown" in Austin, Tex., These normalized locations of the definite locative expressions are the geographic foci of the input question, if there are no definite locative expressions in the input question, the current location of the user who submits the question may be selected for the geographic focus of the question, otherwise no location is selected. These operations are performed when processing the input question in response to it being received by the cognitive system of the illustrative embodiment.

The mechanisms of the illustrative embodiment may further process the input question and generate one or more candidate answers by extracting the candidate answers from the documents of the corpus. Once each token that makes up a candidate answer is assigned a location or geographic focus (e.g., through operation of an ingestion process in which the above operations are performed to associate locations with tokens in the documents, or as part of the processing of the input question, or as a combination thereof), the tokens that make up the candidate answers are used to generate one or more geographic foci of the corresponding candidate answer. This may be performed by assigning one or more geographic foci to a candidate answer based on the location or geographic focus of the tokens that compose the candidate answer. If more than one geographic focus is associated with tokens of the candidate answer, then the geographic focus of the candidate answer may be generated based on a predetermined relationship evaluation of the geographic foci. In one illustrative embodiment, this may be simply a union of the geographic foci of the various tokens. Other embodiments might include identifying not just the definite location expression but also relational expressions, such as "near" or "bordering," and incorporating relational information, such as "above" or "within," with the location as a component of the location focus. In addition, a more complex relationship evaluation may be performed on the geographic foci to include more complex compatibility conditions between clauses than simple matching.

Having determined a geographic focus for the input question and a contextual geographic focus for each of the candidate answers, the candidate answers are then scored according to the geographic relevance of the candidate answer with respect to the input question. For example, in one illustrative embodiment, the candidate answer may be given a high score, e.g., a "1.0", if there is a location in the geographic focus or foci of the input question which geographically matches a location in the geographic focus or foci of the candidate answer (if the question is a location-non-monotonic question) or which geographically includes a location in the geographic focus or foci of the candidate answer (if the question is location-upward-monotonic). Otherwise, if there is no such location, then the candidate answer may be given a second or low score, e.g., "0". It should be appreciated that this is only one simple example. More complex scoring may be used, such as proximity-based scoring which evaluates how close the geographic foci of the input question are to the contextual geographic focus of the candidate answer such that a range of scores between the first and second scores may be assigned to a candidate answer. For example, a proximity measure of the geographic foci of the input question to the contextual geographic focus of the candidate answer may be evaluated such that candidate answers that are more remotely proximate to the geographic foci of the input question are scored lower than those that are more closely proximate to the geographic foci of the input question. Various other metrics for scoring candidate answers with regard to geographic relevance to the input question may be used without departing from the spirit and scope of the present invention.

It should also be appreciated that the geographic focus based scoring of candidate answers may be used as part of a more complex scoring of candidate answers, such as may be performed by known or later developed cognitive systems and question answering (QA) systems. For example, the IBM Watson cognitive system includes a QA system which scores candidate answers based on a variety of factors. The present geographic focus based scoring may be integrated into a cognitive system and/or QA system, such as IBM Watson™ as an additional factor that is evaluated when scoring candidate answers. In such a case, various weightings may be attributed to the geographic focus based on the particular implementation. For example, in some implementations, the geographic focus may be used as a basis for essentially "ruling out" certain candidate answers, e.g., if the candidate answer's contextual geographic focus is not within the range of the geographic foci of the input question, i.e., there is no overlap of the geographic foci of the input question with the contextual geographic focus of the candidate answer, then the candidate answer may be discarded. In other implementations, the scoring of the candidate answer on the basis of the contextual geographic focus of the candidate answer may be added to the overall scoring of the candidate answer with regard to other factors in order to generate an overall score for the candidate answer for purposes of later ranking of candidate answers. This combination of scoring of various factors may be weighted according to a predetermined degree of influence of each factor over the correctness of a candidate answer such that, for example, in some implementations the contextual geographic focus evaluation may have greater influence than in other implementations.

Thus, the illustrative embodiments provide mechanism for scoring candidate answers based on the geographic relevance of the candidate answer to geographic foci of an input question. In this way, candidate answers that are more relevant to the geographic aspects of the input question may be identified such that the most relevant candidate answer may be selected as higher ranking or even final answers for responding to the input question.

Before beginning the discussion of the various aspects of the illustrative embodiments in more detail, it should first be appreciated that throughout this description the term "mechanism" will be used to refer to elements of the present disclosure that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the functionality and operation of a cognitive question answering (QA) systems by efficiently providing ground truth data for improved training and evaluation of cognitive QA systems.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, SMALLTALK, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
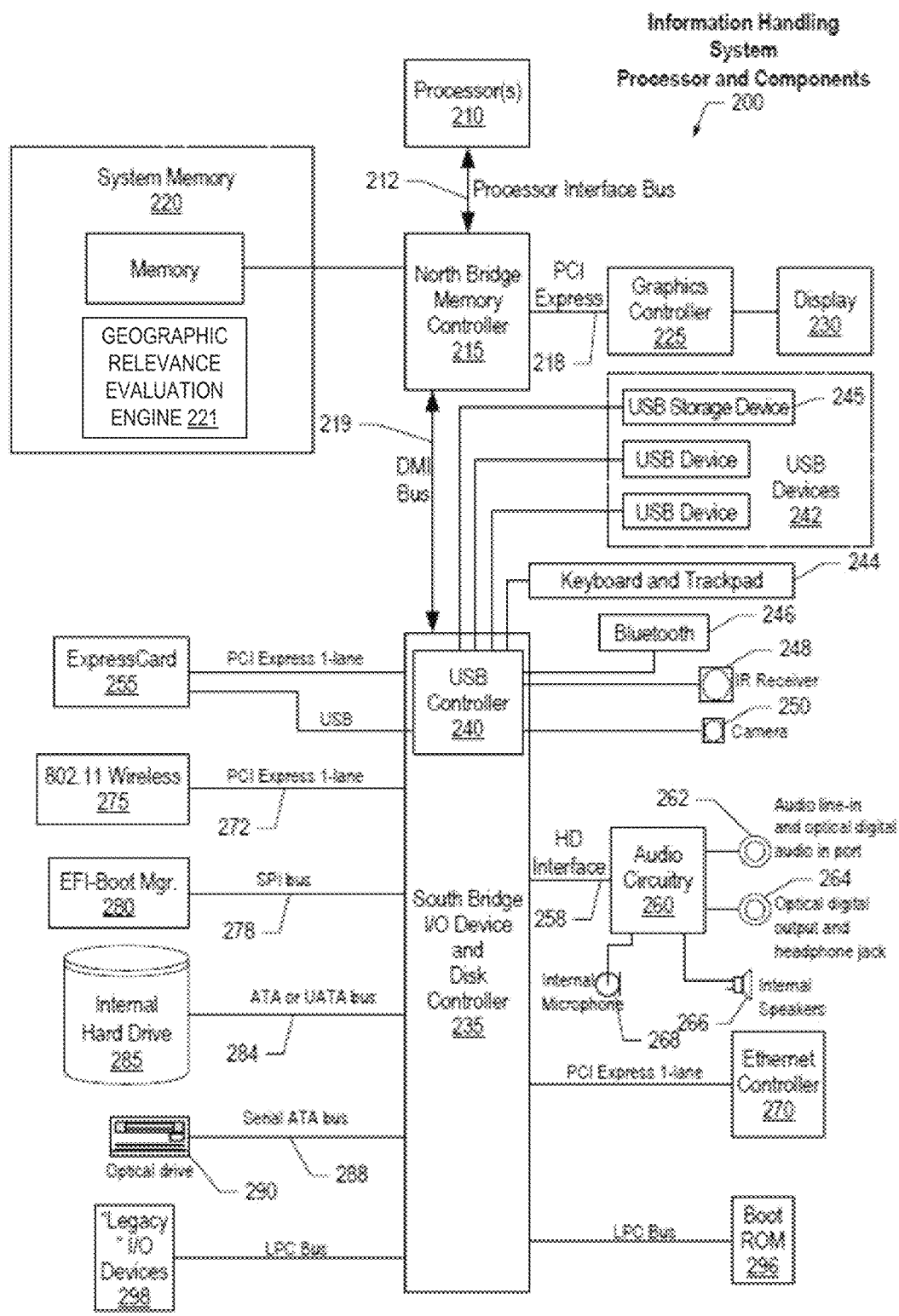
FIG. 2 is a block diagram of a processor and components of an information handling system such as those shown in FIG. 1.
Figure 3:
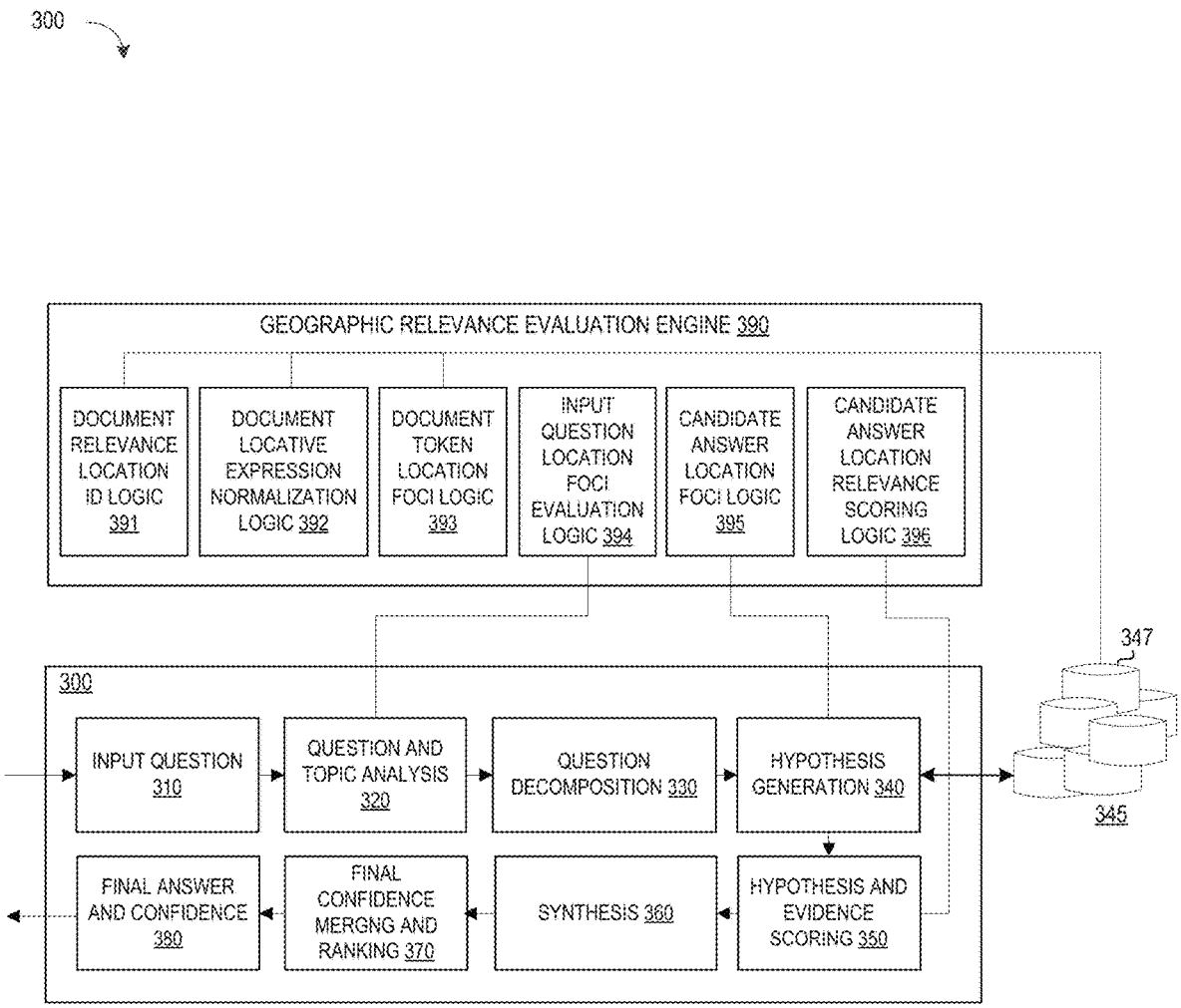
FIG. 3 illustrates a QA system pipeline for processing an input question in accordance with selected illustrative embodiments of the present disclosure.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. The QA pipeline is part of a QA system that may be implemented in the cognitive system. The cognitive system, while shown as having a single QA pipeline, may in fact have multiple QA pipelines. Each QA pipeline may be separately trained for answer input questions of a different domain or be configured to perform the same or different analysis on input questions, depending on the desired implementation. For example, in some cases, a first QA pipeline may be trained to operate on input questions in a financial domain while another QA pipeline may be trained to answer input questions in a medical diagnostics domain. Moreover, each QA pipeline may have their own associated corpus or corpora that they ingest and operate on, e.g., one corpus for financial domain documents and another corpus for medical diagnostics domain related documents in the above examples. In some cases, the QA pipelines may each operate on the same domain of input questions but may have different configurations, e.g., different annotators or differently trained annotators, such that different analysis and potential answers are generated. The QA system may provide additional logic for routing input questions to the appropriate QA pipeline, such as based on a determined domain of the input question, combining and evaluating final answers generated by multiple QA pipelines, and other control and interaction logic that facilitates the utilization of multiple QA pipelines.

As will be discussed in greater detail hereafter, the illustrative embodiments are integrated in, augment, and extend the functionality of these QA mechanisms of the cognitive system with regard to evaluating the geographic relevance of candidate answers to the geographic foci of an input question. These mechanisms extend the functionality by providing logic for identifying tokens in documents and associating with these tokens one or more geographic foci. The mechanisms further extend the functionality by identifying one or more geographic foci of the input question, associating with candidate answers a contextual geographic focus based on the geographic foci of the tokens associated with the candidate answer, and then score the candidate answers based on the relevance of the contextual geographic focus of the candidate answers to the one or more geographic foci of the input question. In this way, more geographically relevant candidate answers are ranked higher than less or non-geographically relevant candidate answers. Thus, more improved answer results are generated.

Since the present invention extends the functionality of a QA system, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language High degree of recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e., candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these questions and answer attributes of the content.

Operating on such content, the QA pipeline generates answers for input questions using a plurality of intensive analysis mechanisms which evaluate the content to identify the most probable answers, i.e., candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 in which a pipelined question/answer (QA) system 101 is connected to a computer network 180. The QA system 101 may include one or more QA system pipelines 101A, 101B, each of which includes a knowledge manager computing device 102 (comprising one or more processors and one or more memories, and potentially any other computing device elements generally known in the art including buses, storage devices, communication interfaces, and the like) for processing questions received over the network 180 from one or more users at computing devices (e.g., 110, 120, 130). Over the network 180, the computing devices communicate with each other and with other devices or components via one or more wired and/or wireless data communication links, where each communication link may comprise one or more of wires, routers, switches, transmitters, receivers, or the like, in this networked arrangement, the QA system 101 and network 180 may enable question/answer (QA) generation functionality for one or more content users. Other embodiments of QA system 101 may be used with components, systems, subsystems, and/or devices other than those that are depicted herein.

In the QA system 101, the knowledge manager 102 may be configured to receive inputs from various sources. For example, knowledge manager 102 may receive input from the network 180, one or more knowledge bases or corpora 106 of electronic documents 107, semantic data 108, or other data, content users, and other possible sources of input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 180 may include access points for content creators and content users. Some of the computing devices may include devices for a database storing the corpus of data as the body of information used by the knowledge manager 102 to generate answers to cases. The network 180 may include local network connections and remote connections in various embodiments, such that knowledge manager 102 may operate in environments of any size, including local networks (e.g., LAN) and global networks (e.g., the Internet). Additionally, knowledge manager 102 serves as a front-end system that can make available a variety of knowledge extracted from or represented in documents, network-accessible sources and/or structured data sources. In this manner, some processes populate the knowledge manager which may include input interfaces to receive knowledge requests and respond accordingly.

In one embodiment, the content creator creates content in an electronic document 107 for use as part of a corpora 106 of data with knowledge manager 102. The corpora 106 may include any structured and unstructured documents, including but not limited to any file, text, article, or source of data (e.g., scholarly articles, dictionary definitions, encyclopedia references, and the like) for use by the knowledge manager 102. Content users may access the knowledge manager 102 via a connection or an Internet connection to the network 180, and may input questions to the knowledge manager 102 that may be answered by the content in the corpus of data.

As further described below, when a process evaluates a given section of a document for semantic content, the process can use a variety of conventions to query it from the knowledge manager. One convention is to send a well-formed question 10, Semantic content is content based on the relation between signifiers, such as words, phrases, signs, and symbols, and what they stand for, their denotation, or connotation. In other words, semantic content is content that interprets an expression, such as by using Natural Language (NL) Processing, in one embodiment, the process sends well-formed questions 10 (e.g., natural language questions, etc.) to the knowledge manager 102. Knowledge manager 102 may interpret the question and provide a response to the content user containing one or more answers 20 to the question 10. In some embodiments, the knowledge manager 102 may provide a response to users in a ranked list of answers 20.

In some illustrative embodiments, QA system 101 may be the IBM Watson™ QA system available from International Business Machines Corporation of Armonk, N.Y., which is augmented with the mechanisms of the illustrative embodiments described hereafter. The IBM Watson™ knowledge manager system may receive an input question 10 which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 101 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ A system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 101 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a geographic relevance evaluation engine 105. The geographic relevance evaluation engine 105 provides logic that may be utilized by the cognitive system 100 during ingestion of the documents of the knowledge database or corpus 106 and/or during runtime evaluation of input questions from client computing devices (e.g., 110, 120) to evaluate the geographic characteristics of portions of content of the documents and associated with these portions of content metadata identifying a geographic focus or foci of the portion of content. For example, the documents may be analyzed to identify a document relevance location which is then used as a basis for associating a location with each of the definite locative expressions in the content of the document, which is then in turn used, along with the document relevance location of the document, as a basis for associating with each token in the document a closest geographic focus or foci. Thus, each token of each document may have an associated geographic focus or foci. In addition, the geographic relevance evaluation engine 105 provides logic that analyzes an input portion of text, e.g., an input question, input search query, or the like, and identifies one or more geographic foci of the input portion of text, which for purposes of the present description will be assumed to be an input natural language question. In selected embodiments, the QA system 101 may be pipelined with a plurality of QA systems 101A, 101B for processing the input question to generate candidate answers based on the corpus 106 and these candidate answers may be evaluated to identify a contextual geographic focus for each of the candidate answers. The contextual geographic focus is determined based on the geographic focus or foci of the terms in the candidate answer. The contextual geographic focus of the candidate answer is then compared to the geographic focus or foci of the input question and the candidate answer is scored based on the results of the comparison.

In an example embodiment of the QA system 101 shown in FIG. 1, a natural language processor 104 and geographic relevance evaluation engine 105 may be embodied as part of a QA information handling system 103 in the knowledge manager 102, or as a separate information handling system, to execute a process that extracts and compares geographic foci from the input natural language question and candidate answers to evaluate the geographic relevance of an answer candidate. Syntactically, a "geographic focus" of a text is the definite geographical region which is being described or discussed in the text. To this end, the geographic relevance evaluation engine 105 may include document location and normalization logic 11 which identifies a document-relevance location for a document in the corpus, such as the location of publication for the document, and extracts definite locative expressions from the document. In addition, the document location and normalization logic 11 normalizes any document-relevance location and extracted definite locative expressions in the document, such as by accessing a geographical named entity resource 109 (e.g., a gazetteer) that is stored in the knowledge base 106 so as to associate such information with a standardized geographic reference for purposes of comparison. Once the normalized document-relevance location and definite locative expressions are available, document token location foci logic 12 acts as a learning device to associate each token in a document with one or more location foci. Using the tokenized location foci, the candidate answer location foci logic 13 identifies one or more location foci for each candidate answer generated by the QA system on the basis of the location foci of the tokens in the candidate answer. The geographic relevance evaluation engine 105 also includes question location foci and normalization logic 14 that applies similar techniques to analyze in input question to identify a location focus or source for the question which may also be normalized with reference to the geographical named entity resource 109. The resulting location foci from the question and candidate answer are evaluated with the candidate answer location relevance scoring logic 15 which provides a score for the answer candidate for the question on the basis of the relationship between the location foci of the question and the location foci of the answer candidate.

While there are existing solutions for answering questions about geographic facts, such solutions are not readily applied to help select appropriate answers to general factoid questions having contextual geographic information. In order to illustrate the operation of an illustrative embodiment of the present disclosure which leverages geographical context for general question answering of factoid input questions, reference will be repeatedly made hereafter to an example scenario in which the input question received by the cognitive system 100 is processed by the QA system 101 to provide an answer. In this example, the input question "How many pedestrians were killed in traffic accidents in 2010 in Washington, D.C.?"—is a question whose answer is not at all geographic in nature, but is instead a question about traffic fatalities. Nevertheless, in order to correctly answer this question, geographic contextual information needs to be leveraged. To this end, the geographic relevance evaluation engine 105 leverages geographical contextual information in the question and geographic contextual information in the document and passage from which the answer to the question is extracted to improve question answering accuracy. Continuing with this example, the example portion of content from a document in the corpus 106 that will be used for purposes of this running example, will be the following passage, which will be referred to as passage P in document D:

Washington Post

"A new report shows that more than half of those killed in traffic accidents in the nation's capital in 2010 were pedestrians. The report from the National Highway Traffic Safety Administration shows that of the 24 traffic fatalities in the District of Columbia in 2010, 13 were pedestrians, or 54 percent. Nationally, 4,000 pedestrians died in traffic accidents in 2010, or 13 percent. In Maryland, 20.5 percent of traffic fatalities were pedestrians."

Although this passage contains the correct answer ("13"), a question answering system which does not leverage contextual geographic information from the question and answer candidate is likely to provide the answer "4000" as its highest ranked answer. To distinguish the correct answer from the other topically appropriate answers in this passage, contextual geographic information in the question and in the passage are leveraged by applying geographical name identification and disambiguation techniques to score and rank answer candidates.

With this example in mind, as discussed previously, a set of operations are performed to associate each of the tokens of documents in the corpus 106 with a corresponding location focus or foci that can later be used to determine a contextual location focus of candidate answers that comprise those tokens. In order to generate such a location focus or foci for each of the tokens, the context of the tokens within the document must be evaluated and the location characteristics of the context must be determined. This can be done as part of an ingestion operation, such as when the corpus 106 is ingested by the cognitive system 100 for use by the QA system 101, where ingestion is a process of analyzing natural language content and generating an in-memory representation of that content. These operations can also be done on an as needed based, such as during runtime processing of an input question, e.g., in response to a candidate answer being identified in the document, the document may then be analyzed in the manner described herein to identify location characteristics and location foci associated with the candidate answer. It should be appreciated that for ease of explanation, the example above, and the following description will be provided with regard to a single document, however this process may be repeated for each document in the corpus 106 or for each document with which a candidate answer is associated.

The document location normalization logic 11 performs operations for identifying an appropriate document relevance location for the document and normalizing all definite locative expressions in the document by associating a location with each such definite locative expressions. In selected embodiments, the document location normalization logic 11 first identifies an appropriate document relevance location, such as a publication location, ingestion location, a known focus location for the document source, or the like, for the document. This operation may include analyzing metadata associated with the document to extract a location considered to be the document context location for the document which is most appropriate for use as a document relevance location. If there is more than one location associated with the document, the document location normalization logic 11 may have been configured with a priority or preference ordering of locations to be used for selecting among available locations. Thus, using the above example, passage P may be provided in document D which has a publication location of "Washington, D.C." and an ingestion location of "Arlington, Va." This information may be present in metadata of the document D which may be analyzed by the document location normalization logic 11 which then, in accordance with its configured prioritization of locations, selects the location of "Washington, D.C." as the document relevance location for document D.

The document location normalization logic 11 also normalizes all definite locative expressions in the document D by associating a location with each such expression. This operation first requires the identification of definite locative expressions within the document D. Such operations may be performed by performing a matching operation between content of the document D and a predetermined set of definite locative expressions that are recognized by the document location normalization logic 11, which may be specified as one or more tokens, words, phrases, or the like. Thus, for example, in the passage P above, the definite locative expressions that may be found are "nation's capital," "District of Columbia," "nationally," and "Maryland," and the corresponding normalized locations are "Washington, D.C.," "Washington, D.C.," "U.S.A." and "Maryland, U.S.A."

The normalization performed by the document location normalization logic 11 may comprise analyzing the found definite locative expressions to determine if a particular location is expressly stated in the expression or if the definite locative expression needs to be evaluated relative to the document relevance location. For example, if the definite locative expression mentions a specific location, e.g., "Vancouver, Canada," then a relative evaluation is not necessary and the specific location may be adopted as the location for the definite locative expression. However, if the definite locative expression (e.g., "Vancouver") does not mention a specific location, then the document location normalization logic 11 may use a geographical named entity resource 109 (such as a gazetteer or Wikipedia) to disambiguate the document relevance location (perhaps the source location) to associate the locative expression with a specific location.

Furthermore, the document token location foci logic 12 also associates with each token in the document (e.g., word or group of alphanumeric characters) one or more location foci, making use of the document relevance location and the normalized locative expressions associated with the portion of document D and/or portion of text, e.g., passage P, in which the token is present or which is closest to the token from the standpoint of distance measured as a number of tokens (e.g., words), as well as considering other characteristics of the token and surrounding text including syntactic structure, matching verb tense between token and text corresponding to normalized locative expressions, and the like. Thus, for example, in the passage P above, each of the words, or tokens, in the passage P may have associated with it an associated location that is the location associated with the closest definite locative expression in the passage P, with the first sentence passage tokens being associated with a [U.S.A.] geographic focus, the second sentence passage tokens being associated with a [Washington, D.C.] geographic focus, the third sentence passage tokens being associated with a [U.S.A.] geographic focus, and the fourth sentence passage tokens being associated with a [Maryland, U.S.A.] geographic focus.

As will be appreciated, the analysis performed by the logic 11-12 may be performed as part of an ingestion operation in which documents of the corpus 106 are ingested for use by the cognitive system 100 when processing an input portion of text, e.g., input question or search query. Alternatively, the operation of logic 11-12 may be performed during runtime processing of the input portion of text.

In addition, the input question location foci evaluation logic 14 determines one or more location foci of the input portion of text, e.g., input natural language question. The identification of the one or more location foci may comprise using the current location of the user who is submitting the question as the relevant contextual location for the input question or another user-associated location, such as a primary location of interest stored in a profile. The mechanisms may then identify and normalize all definite location expressions in the question with respect to this relevant contextual location with reference to the geographical named entity resource 109. The normalization of the definite locative expressions may be performed in a similar manner as described above with regard to normalization performed by the document location normalization logic 11. The resulting normalized locations of the definite locative expressions are the location foci of the input question. If there are no definite locative expressions in the input question, a location associated with the user may be selected, otherwise no location is selected. These operations are performed when processing the input question in response to it being received by the cognitive system 100 of the illustrative embodiment.

The QA system 101 of the cognitive system 100 may further process the input question and generate one or more candidate answers by extracting the candidate answers from the documents of the corpus 106. The candidate answers may be further evaluated by the candidate answer location foci logic 13 and candidate answer location relevance scoring logic 15 working in conjunction with the QA system 101.

Either previously, through operation of an ingestion process in which the above operations are performed to associate locations with tokens in the documents, or as part of the processing of the input question, the tokens that make up the candidate answers are used to generate one or more location foci of the corresponding candidate answer. That is, the candidate answer location foci logic 13 takes the candidate answers generated by the QA system 101 and identifies the locations associated with the tokens that make up the candidate answer. The word or words of the candidate answer may, through the operations performed above, be used to generate a location focus associated with the candidate answer. If more than one location foci are associated with tokens of the candidate answer, then the location focus of the candidate answer may be generated by the candidate answer location foci logic 13 based on a predetermined relationship evaluation of the location foci. In one illustrative embodiment, this may be simply a union of the location foci of the various tokens. In other illustrative embodiments, a more complex relationship evaluation may be performed on the location foci.

Having determined, by the input question location foci evaluation logic 14, a location focus for the input question and a contextual location focus for each of the candidate answers by the candidate answer location foci logic 13, the candidate answers are then scored by the candidate location relevance scoring logic 15 according to the geographic relevance of the candidate answer with respect to the input question. As noted above, in one illustrative embodiment, the candidate answer may be given a high score, e.g., a "1.0", if there is a location in the geographic focus or foci of the input question which geographically matches a location in the geographic focus or foci of the candidate answer (if the question is a location-non-monotonic question) or which geographically includes a location in the geographic focus or foci of the candidate answer (if the question is location-upward-monotonic). Otherwise, if there is no such location, then the candidate answer may be given a low score, e.g., "0.0". In other illustrative embodiments, a more complex scoring algorithm may be used by the candidate answer location relevance scoring logic 15 which is based on how close the location foci in the input question are to the contextual location focus of the candidate answer, such that a range of scores between the first and second scores may be assigned to a candidate answer. Various other metrics for scoring candidate answers with regard to location relevance to the input question may be used without departing from the spirit and scope of the present invention.

In various embodiments, the QA system 101 is implemented to receive a variety of data from various computing devices (e.g., 110, 120, 130, 140, 150, 160, 170) and/or other data sources, which in turn is used to perform QA operations described in greater detail herein. In certain embodiments, the QA system 101 may receive a first set of information from a first computing device (e.g., laptop computer 130) which is used to perform QA processing operations resulting in the generation of a second set of data, which in turn is provided to a second computing device server 160). In response, the second computing device may process the second set of data to generate a third set of data, which is then provided back to the QA system 101. In turn, the QA system 101 may perform additional QA processing operations on the third set of data to generate a fourth set of data, which is then provided to the first computing device (e.g., 130). In various embodiments the exchange of data between various computing devices (e.g., 101, 110, 120, 130, 140, 150, 160, 170) results in more efficient processing of data as each of the computing devices can be optimized for the types of data it processes. Likewise, the most appropriate data for a particular purpose can be sourced from the most suitable computing device (e.g., 110, 120, 130, 140, 150, 160, 170) or data source, thereby increasing processing efficiency. Skilled practitioners of the art will realize that many such embodiments are possible and that the foregoing is not intended to limit the spirit, scope or intent of the invention.

Types of information handling systems that can utilize QA system 101 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, server 160, and mainframe computer 170. As shown, the various information handling systems can be networked together using computer network 180. Types of computer network 180 that can be used to interconnect the various information handling systems include Personal Area Networks (PANs), Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores. For example, server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a geographic relevance evaluation engine module 221 which may be invoked to evaluate the geographic relevance of an answer candidate to an input question by determining a geographic focus of the input question and one or more contextual geographic foci for generated answer candidates to thereby score the answer candidates on the basis of the geographic relationship between the geographic foci for the question and answer candidates generated by a cognitive computing system (e.g., an IBM Watson™ QA system). Graphics controller 225 also connects to Northbridge 215. In one embodiment, PCI EXPRESS bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI EXPRESS busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

EXPRESSCARD 255 is a slot that connects hot-pluggable devices to the information handling system. EXPRESSCARD 255 supports both PCI EXPRESS and USB connectivity as it connects to Southbridge 235 using both the Universal Serial Bus (USB) the PCI EXPRESS bus. Southbridge 235 includes USB Controller 240 that provides USB connectivity to devices that connect to the USB. These devices include (camera) 250, infrared (IR) receiver 248, keyboard and trackpad 244, and BLUETOOTH device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a FIREWIRE interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus, Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Turning now to FIG. 3, there is illustrated a QA system pipeline 300 of a cognitive system for processing an input question in accordance with selected illustrative embodiments. The QA system pipeline 300 may be implemented, for example, as QA pipeline 101A, 101B of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Which groups are fighting in Michoacán?" In response to receiving the input question, the next pipeline stage of the QA pipeline 300 is the question and topic analysis stage 320 which parses the input question using natural language processing (NLP) techniques to extract major features from the input question, and classify the major features according to types, e.g., names, dates, or any of a plethora of other defined topics. For example, in the example question above, the term "which" may be associated with a topic for "groups" indicating that the identity of a group is being sought, "Michoacán" may be identified as a proper name of a location with which the question is associated, "in" may be identified as a word indicative of proximity or relationship, and "fighting" may be indicative of an activity or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. The focus of a question is the part of the question that, if replaced by the answer, makes the question a standalone statement. The focus often, but not always, contains the LAT. On the other hand, in many cases it is not possible to infer a meaningful LAT from the focus.

At the question decomposition stage 330, the identified major features are then used to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

Using the hypothesis and evidence scoring stage 350, the QA pipeline 300 then performs a deep analysis and comparison of the language of the input question and the language of each hypothesis or "candidate answer," along with evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e., a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer. As will be appreciated, this is just one simple example of how scoring can be performed, and many other algorithms of various complexity may be used to generate scores for candidate answers and evidence without departing from the spirit and scope of the present invention.

In the synthesis stage 360, the scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation. The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e., that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, selected illustrative embodiments of the QA system pipeline 300 operate in conjunction with a geographic relevance evaluation engine 390 which provides logic and functionality for evaluating the geographic characteristics of documents, portions of content within documents, input questions, tokens of candidate answers, and scoring candidate answers based on the correspondence of these geographic characteristics of the input question and tokens associated with the candidate answers. It should be appreciated that while FIG. 3 shows the geographic relevance evaluation engine 390 as being a separate element from the QA system pipeline 300, in some illustrative embodiments, one or more of the elements of the geographic relevance evaluation engine 390, or the engine 390 as a whole, may be integrated into the QA system pipeline 300 as an additional stage or as additional logic added to one or more of the individual stages 310-380 of the QA system pipeline 300, without departing from the spirit and scope of the present invention. For example, in one illustrative embodiment, the input question location foci evaluation logic 394 may be integrated into the question and topic analysis stage logic 320, the candidate answer location foci logic 395 may be integrated into the hypothesis generation stage logic 340, and the candidate answer location relevance scoring logic 396 may be integrated into the hypothesis and evidence scoring stage logic 350.

The document relevance location ID logic 391, document locative expression normalization logic 392, and document token location foci logic 393, which perform the operations and provide the logic as discussed above with regard to elements 11 and 12 in FIG. 1, may operate as part of a pre-processing operation that operates on the contents of documents of the corpus or corpora 345, 347 prior to the QA system pipeline 300 utilizing the content of these documents to answer questions submitted to the QA system pipeline 300. Thus, as part of an ingestion operation, in addition to the various analysis and annotation performed by the mechanisms of the cognitive system and QA system discussed above to generate an in-memory representation of the documents of the corpus or corpora 345, 347, the additional processing discussed previously with regard to elements 11 and 12 may be performed by the document relevance location ID logic 391, document locative expression normalization logic 392, and document token location foci logic 393 to associate with tokens in the content location foci based on evaluations of document relevance location, definite locative expressions, and identifying a closest definite locative expression to the token that is used to associate its location focus or foci with the token. Thus, each token in the content of a document will have its own associated location focus or foci. Alternatively, as mentioned above, these processes may be performed during real time in response to an input question being received by the QA system pipeline 300 and may be done with regard to a specific document associated with a candidate answer identified through the processing of the QA system pipeline 300.

In addition, in response to the QA system pipeline 300 receiving an input question and performing its initial processing of the input question via stages 310 and 320, the input question, or the results of the processing of the input question via stage 320, is provided to the input question location foci evaluation logic 394 which performs operations similar to that described above with regard to element 13 of FIG. 1. That is, the input question location foci evaluation logic 394 operates to determine one or more location foci of the input natural language question. As discussed previously, this may involve identifying one or more location foci using the current location of the user or location of primary interest in the user's profile as the relevant contextual location for the input question and identifying and normalizing all definite locative expressions in the question with respect to this relevant contextual location. This identification and normalization may comprise determining if the question itself specifies a particular location, and if not, whether the input question comprises a definite locative expression that is a relative definite location expression that can be evaluated relative to the relevant contextual location of the input question. If there are no definite location expressions in the input question, the user's location may be selected as the location focus of the input question; otherwise no location is selected.

The operations of input question location foci evaluation logic 394 may be performed in parallel with the operations of stages 320-340 which perform their operations for generating a set of candidate answers to the input question. The candidate answers generated, for example by hypothesis generation stage logic 340 of the QA system pipeline 300, may be further evaluated by the candidate answer location foci logic 395 and candidate answer location relevance scoring logic 396 working in conjunction with the QA system pipeline 300.

As noted above, either previously (through operation of an ingestion process in which the above operations are performed to associate locations with tokens in the documents) or as part of the processing of the input question, the tokens that make up the candidate answers generated by the hypothesis generation stage logic 340 are used by the candidate answer location foci logic 395 to generate one or more location foci of the corresponding candidate answer. That is, the candidate answer location foci logic 395 takes the candidate answers generated by the hypothesis generation stage logic 340 and identifies the locations associated with the tokens that make up the candidate answer. The location foci of the tokens of the candidate answer are then evaluated to generate a single contextual location focus of the candidate answer, such as by way of performing a union of the location foci of the various tokens of the candidate answer or performing a more complex relationship evaluation of the foci of the tokens, as discussed previously. The result is that each candidate answer identified by the hypothesis generation stage logic 340 is associated with a corresponding contextual location focus by the candidate answer location foci logic 395. Moreover, the input question has its own set of one or more location foci as determined by the input question location foci evaluation logic 394.

Having determined a location focus or foci for the input question and a contextual location focus for each of the candidate answers, the candidate answers are then scored by the candidate answer location relevance scoring logic 396 according to the location relevance of the candidate answer with respect to the input question. That is, a score is attributed to each candidate answer based on the relationship of its corresponding contextual location focus with the one or more location foci of the input question. A range of scores may be established such that a highest score indicates an exact match between the contextual location focus of the candidate answer and the location focus or foci of the input question, and a lowest score indicates a complete mismatch between the contextual location focus of the candidate answer and the location focus or foci of the input question. A complete mismatch may be measured in many different ways, e.g., when a location in the location focus of the question is not found in the location focus of a candidate answer.

As noted above, in one illustrative embodiment where the question is categorized as a location-non-monotonic question, the candidate answer may be given a high score (e.g., a "1.0") in the case in which a location in the geographical focus set of the question geographically matches a location in the geographical focus set of the answer. In another illustrative embodiment where the question is categorized as a location-upward-monotonic, the candidate answer may be give the high score (e.g., a "1.0") in the case in which a location in the geographical focus set of the question geographically includes a location in the geographical focus set of the answer. Otherwise, if there is no match or inclusion of this nature, then the candidate answer may be given a low score (e.g., "0.0"). In other illustrative embodiments, a more complex scoring may be used by the candidate answer location relevance scoring logic 396 which is based on a proximity measure or other metric relationship between the location foci in the input question and the contextual location focus of the candidate answer, such that a range of scores between the first and second scores may be assigned to a candidate answer.

Thus, the candidate answer location relevance scoring logic 396 generates a location relevance scoring of the candidate answers based on each candidate answer's location relevance to the input question. These location relevance scores may be provided to the hypothesis and evidence scoring stage logic 350 for use in a more complex scoring of candidate answers that performs scoring based on evidence passages in the corpus or corpora 345, 347 as well as the location relevance scoring. In some illustrative embodiments candidate answers that are determined by the candidate answer location relevance scoring logic 396 to have no location relevance may in fact be eliminated from further evaluation by the logic of the QA system pipeline 300. Thus, the location scores associated with candidate answers generated by the hypothesis generation stage logic 340 may be used to prune the set of candidate answers prior to further evidential evaluation by the hypothesis and evidence scoring stage logic 350. In other illustrative embodiments, the location scores associated with candidate answers may be used as a weight to be applied to the evidence scores generated by the hypothesis and evidence scoring stage logic 350 such that candidate answers that are determined to be more locationally relevant to the input question are weighted more heavily than candidate answers that are not as locationally relevant. Alternatively, in other illustrative embodiments, the location scores of candidate answers may be simply another scoring factor that is weighted according to its determined relative influence on the correctness of candidate answers, which is then combined with the weighted scores of other evidence from the corpus or corpora 345, 347, to generate an overall confidence score for the candidate answers. Any mechanism for integrating the location relevance scoring into an overall scoring of candidate answers may be used without departing from the spirit and scope of the present invention.

Thereafter, the operation of the QA system pipeline 300 is essentially the same as already discussed above. That is, the synthesis stage logic 360, final confidence merging and ranking stage logic 370, and final answer and confidence stage logic 380 operate to rank the candidate answers according to their confidence scores, which includes the location scoring discussed above, and select one or more final answers to be returned as answers to the input question. Thus, location relevance is evaluated using the mechanisms of the illustrative embodiments to provide more accurate evaluations of candidate answers.

Figure 4:
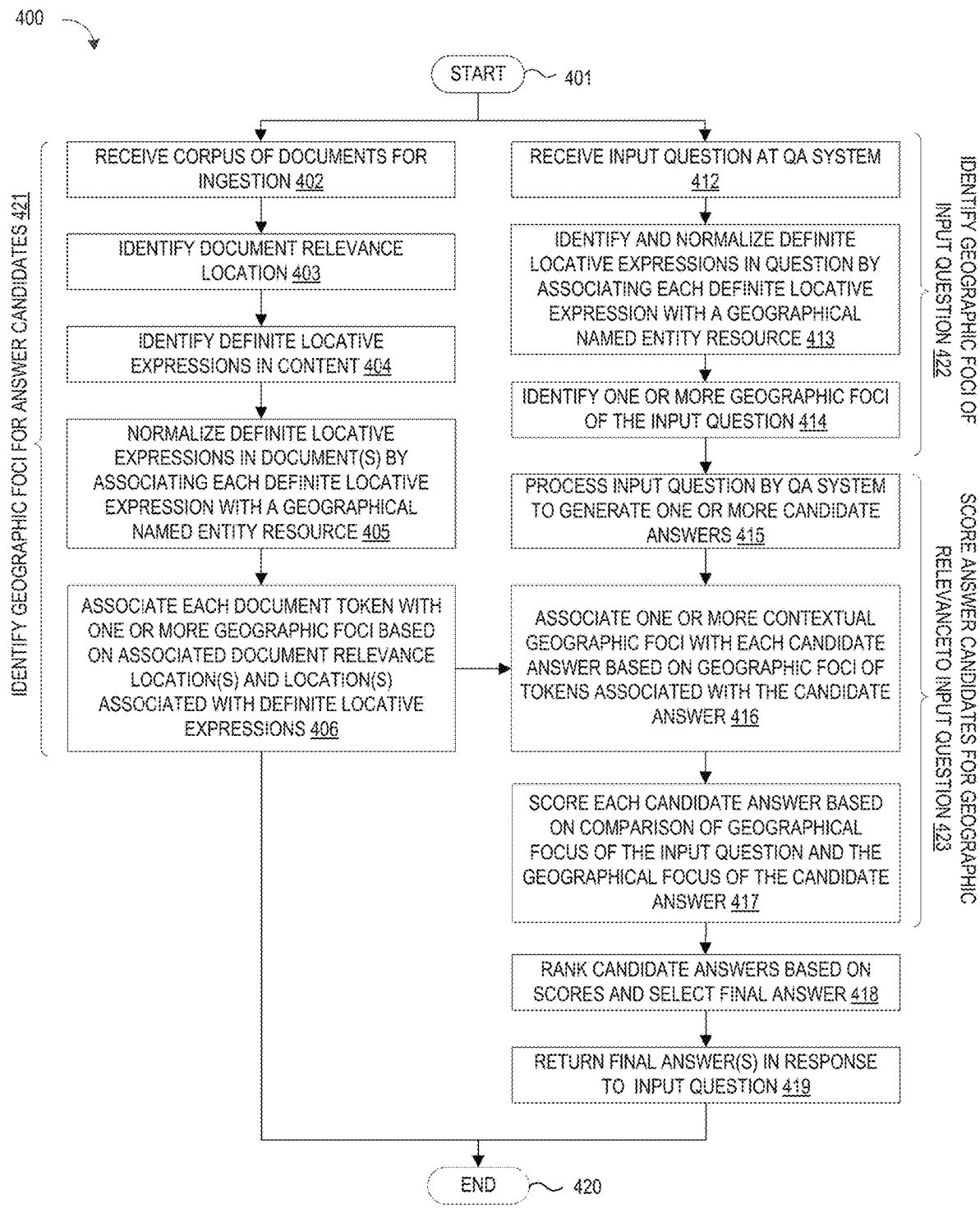
FIG. 4 illustrates a simplified flow chart showing the logic for ingesting documents of a corpus and associating geographic foci with tokens in the documents for use in evaluating candidate answers to an input question based on a geographic focus of the input question and geographic foci of candidate answers in accordance with selected illustrative embodiments of the present disclosure.

Turning now to FIG. 4, there is shown an approach that can be executed on an information handling system to score the geographic relevance of answers in a QA system by ingesting documents of a corpus, associating geographic foci with tokens in the documents, and evaluating candidate answers to an input question based on a geographic focus of the input question and geographic foci of candidate answers. This approach can be implemented at the QA system 101 shown in FIG. 1, or may be implemented as a separate computing system, method, or module. Wherever implemented, the disclosed methodology efficiently identifies the geographic foci of answer candidates in a first step 421, identifies the geographic foci of an input question in a second step 422, and then scores the answer candidates for geographic relevance to the input question at a final step 423. By computing the geographic foci for input questions and answer candidates, answer accuracy will be improved by making use of location information throughout a candidate answer document, thereby contributing to the cognitive behavior of the system as a natural part of human language comprehension involves providing answers which are geographically relevant to the question.

To provide additional details for an improved understanding of selected embodiments of the present disclosure, reference is now made to FIG. 4 which depicts a simplified method flow chart 400 showing the logic for scoring the geographic relevance of answers in a QA system. FIG. 4 processing commences at 401 whereupon, at step 421, the method determines the geographic focus (or foci) of an answer candidate document. Though shown as occurring in parallel with the processing step 422 for identifying geographic foci of the input question, it will be appreciated that the operations at step 421 may occur as part of a pre-processing or ingestion of documents of a corpus for use with a cognitive system. That is, the operations in step 421 may be performed prior to handling a cognitive operation request, such as the input of a natural language question or search query, for example. In selected example embodiments, the processing at step 421 may be performed by the document relevance location ID logic 391, document locative expression normalization logic 392, and document token location foci logic 393. As shown in FIG. 4, the processing at step 421 may start by receiving a corpus of documents for ingestion (step 402). A document relevance location for each of the documents is identified (step 403), such as by processing metadata associated with each of the documents. As noted above, this document relevance location may be identified by selecting from the meta-data of each document a location to be considered the "document context location" for that document in the collection, such as (in order of preference) either the publication location of the document, or a known focus location for the source of the document, or the creation location of the document or the location of ingestion of the document.

By analyzing the content of the documents, definite locative expressions are identified (at step 404) and then normalized (at step 405) to resolve all definite locative expressions in the document. As noted above, the identified definite locative expressions, an if needed, the document relevance location information, may be resolved by using a geographical named entity resource 109 (e.g., a gazetteer or Wikipedia resource) to identify and resolve the reference for all locative expressions in the document (associating with each location expression in the text a location) with respect to the selected document context location.

At step 406, each token in the document is identified and associated with a closest geographic focus or foci based on associated document relevance locations and locations associated with definite locative expressions, if any, such that the corresponding geographic focus or foci may be associated with the token. In selected embodiments, the token association processing at step 406 may be implemented with a sequence of computational steps which parse a sentence in which a location term appears in order to associate each token with one or more geographic foci. If there is at least one resolved location expression in the sentence, the closest expression to that term is selected (such as by using the "nodecount" metric) to associate the location of this expression with the token. Alternatively, the computational processing locates the closest resolved location expression in prior text and associates the location for this expression with the term. If no such resolved expression is found, the document context location is associated with the term. Other embodiments might include identifying not just the definite location expression but also relational expressions, such as "near" or "bordering" and incorporating relational information such as "above" or "within" with the location as a component of the location focus. In addition, other embodiments might include more complex compatibility conditions between clauses than simple matching. The geographic foci associated with the tokens is stored in association with the tokens in the in-memory representation of the documents of the corpus for further use by the cognitive system when performing cognitive operations, such as question answering, cognitive searching of the corpus, or the like.

At a time that could occur before, during, or after with the answer candidate processing step 421, the method determines the geographic focus (or foci) of an input question at step 422. In selected embodiments, the operations in step 422 may be performed after corpus ingestion when handling a cognitive operation request, such as the input of a natural language question or search query, for example. In selected example embodiments, the processing at step 422 may be performed by the input question location foci logic 394 in combination with the question input stage 310 and question and topic analysis stage 320. As shown in FIG. 4, the processing at step 422 may start by receiving an input question at the QA system (step 412). Using a geographical named entity resource, such as a gazetteer, the definite locative expressions in the received input question are identified and normalized (at step 413) for use in identifying one or more geographic foci of the input question (at step 414). In selected embodiments, the processing at steps 413-414 may be implemented with a sequence of computational steps which use the current location (the user's location) or a location of primary interest in the user's profile as the relevant contextual location for the question, and which identify and resolve all definite locative expressions in the question with respect to this contextual location, thereby using these locations as the geographic foci of the question. If there are no definite locative expressions in the question, the user's location is selected. As will be appreciated, other embodiments might include more complex relations among the associated locations, such as the minimally overlapping locations. In addition other embodiments might include relational information such as "within" or "near" with the resolved location as part of the location focus information, or might draw context from additional sources such as previously asked questions.

To provide a simple example of how the QA system scores an answer candidate with respect to an input question, consider the example question, "In Washington D.C., how many restaurants serve sushi?" received at step 412. Through analysis of the input question, a geographical focus [Washington, D.C., USA] would be identified at step 422. Through processing of a corpus of documents by the QA system to generate answer candidates to the input natural language question at step 415, an answer candidate "30" may be extracted from a first document passage (e.g., "The District of Columbia has extensive variety in fine Japanese dining. About 30 restaurants serving sushi") that was processed at step 421 to identify a geographic focus [Washington, D.C., USA] in the document passage. Upon determining that these foci are identical at the comparison step 416, the answer candidate would be scored with a 1.0 at step 417. However, another answer candidate "1500" extracted at step 415 from a second document passage (e.g., "Washington State is a fish lovers paradise. Over 1500 restaurants serve Sushi") would be processed at step 421 to identify the geographic focus [Washington, USA]. In this case where the question focus and the answer focus are distinct, the answer candidate would be scored at step 417 with 0.0 on the geographic relevance score.

Once the input question is processed to identify its geographic focus or foci, the input question is processed by the QA system to generate one or more candidate answers (step 415). A contextual geographic focus or foci is determined for each candidate answer based on the geographic foci of the tokens associated with the candidate answer (step 416). This may be performed, for example, by the candidate answer location foci logic 395. In selected embodiments, the processing at step 416 to may be implemented with a sequence of computational steps to identify a geographic focus of an answer by identifying the associated locations for all terms that make up the answer, and then computing the union of these terms to identify the geographic focus of the answer. Other embodiments might include more complex relations among the associated locations, such as the minimally overlapping location. In addition, other embodiments might include relational information such as "within" or "near" with the location as part of the geographic focus information.

The candidate answers are then each scored according to results of a comparison of the contextual geographic focus or foci of the candidate answer and the geographic focus or foci of the input question (step 417). This geographic scoring may be performed, for example, by the candidate answer location relevance scoring logic 396. In selected embodiments, the processing at step 417 to may be implemented with a sequence of computational steps to first categorize the question as location-non-monotonic or location-upward-monotonic question. As noted above, the candidate answer may be given a high score (e.g., a "1.0") in the case in which a location in the geographical focus set of the question geographically matches a location in the geographical focus set of the answer (if the question is location-non-monotonic question). And in the case of a location-upward-monotonic question, the candidate answer may be given a high score (e.g., a "1.0") when a location in the geographical focus set of the question geographically includes location in the geographical focus set of the answer. However, if there is no such location, then the candidate answer is given a low score (e.g., a "0.0"). Other embodiments might include scores based on proximity or other metric relations between the geographic focus of the question and the answer candidate.

The geographic scoring at step 560 may be combined with or separate from normal scoring operations of candidate answers on an evidentiary basis to generate a confidence score for each candidate answer. The candidate answers are then ranked according to the confidence scores of the candidate answers, including the geographic scoring, and one or more final answers to the input question are selected (step 418). The selected final answer(s) are then returned as answers to the input question (step 419), and the operation then terminates (step 420).

As will be appreciated, the above illustrative embodiments have been described in the context of a QA system answering an input question, by the illustrative embodiments are not limited to such a context. Rather, the illustrative embodiments may be implemented in any cognitive system that processes requests based on documents in a corpus of documents using cognitive logic processes. For example, the illustrative embodiments may be used in a cognitive search engine where, rather than an input question, a search query may be input and the search query may be processed to identify geographic foci with search results being returned and evaluated by the mechanisms of the illustrative embodiments to identify a contextual geographic focus of the search results, which are then scored and ranked in accordance with the mechanisms of the illustrative embodiments as described above. Other cognitive systems based on natural language processing of documents or other content may also be augmented with the mechanisms of the illustrative embodiments to evaluate portions of text with regard to a geographic relevance to a particular input, e.g., patient electronic record evaluation systems, cognitive law enforcement systems, or the like. Any cognitive system that analyzes textual content may be augmented to include the geographic relevance evaluation logic of the illustrative embodiments to evaluate the relevance of one portion of text to another portion of text, without departing from the spirit and scope of the present invention.

While the example embodiments set forth in the Figures and described herein a primarily directed to the answering of natural language input questions using a corpus or corpora of natural language documents, the illustrative embodiments are not limited to such and any cognitive system performing cognitive operations may make use of the mechanisms of the illustrative embodiments to determine a geographic relevance of results to an initial request. For example, with regard to a cognitive system that operates as a cognitive search engine, rather than an input natural language question being processed, an input of a natural language search query may be received and processed by the cognitive search engine so as to return search results that are most relevant to the search query. The operations of the illustrative embodiments may be used to process the input search query to identify a geographic focus or foci of the search query and then compare contextual geographic foci of potential search results, found by performing keyword searching and the like, with the geographic foci of the input search query. The ranking of potential search results may then be made based on a scoring of the potential search results both with regard to a degree of matching of the keywords of the search query as well as the geographic relevance of the search results to the search query as determined from the comparison of geographic foci and contextual geographic foci.

For example, the search query may be of the type "news stories about bankruptcy filings in the last month." The search query may be analyzed using the mechanisms of the illustrative embodiments to determine that the geographic focus or foci of the input search query is "Austin, Tex." The search query may be evaluated to identify search results matching the keywords or criteria of the search query, e.g., portions of content that are new stories that discuss bankruptcy filings in Austin, Tex. The geographic focus or foci of the input search query may be evaluated against the contextual geographic focus of potential search results to score them according to their geographic relevance to the input search query, rank them, and return a ranked set of search results.

By now, it will be appreciated that there is disclosed herein a system, method, apparatus, and computer program product for scoring candidate answers for geographic relevance at an information handling system having a processor and a memory. As disclosed, the system, method, apparatus, and computer program product are embodied to receive an input question for analysis by the information handling system and identify one or more first geographic foci of the input question. In selected embodiments, the input question is analyzed by identifying a definite location expression for the input question from geographical contextual information associated with the input question, and processing (e.g., normalizing) the definite location expression to identify the one or more first geographic foci of the input question. The definite location expression may be identified from geographical contextual information, such as the current location of a user who submitted the input question or a user-associated location for a user who submitted the input question. To answer the question, a corpus of documents is processed based on the input question to generate a candidate answer to the input question from one or more corpus documents. In connection with the candidate answer, one or more second geographic foci are identified for the candidate answer, such as by identifying document location information associated with a corpus document and associating each token in the corpus document is associated with the document location information associated with a received corpus document. Based at least in part on a comparison of the first and second geographic foci, a geographic relevance score is generated for the candidate answer, such as by analyzing the input question to categorize the input question as location-non-monotonic or location-upward-monotonic; and scoring the candidate answer with a first geographic relevance score based on whether the one or more first geographic foci for the received input question geographically matches or includes the one or more second geographic foci for the candidate answer. In embodiments where the document location information is identified by analyzing the corpus document to determine a document relevance location based on at least one of metadata or content of the corpus document, each definite locative expression contained in the corpus document may be associated with a location with the definite locative expression so that the one or more second geographic foci for the candidate answer is generated based on at least one of the document relevance location or the location of the definite locative expression.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of scoring candidate answers for geographic relevance, the method comprising:
   receiving, by an information handling system, comprising a processor and a memory, an input question for answering by the information handling system;
   analyzing, by the information handling system, the input question to identify one or more first geographic foci of the input question by using the processor to identify geographical contextual information for the input question which is used to identify and normalize all definite locative expressions in the input question with respect to the geographical contextual information for the input question, thereby generating and storing the first geographic foci of the input question in memory;
   processing, by the information handling system, a corpus of documents using cognitive analysis comprising natural language processing and machine learning to generate a candidate answer to the input question;
   identifying, by the information handling system, one or more second geographic foci for the candidate answer by using the processor to identify geographical contextual information for the candidate answer which is used to identify and normalize all definite locative expressions in the candidate answer with respect to the geographical contextual information for the candidate answer, thereby generating the second geographic foci of the input question;
   generating, by the information handling system, a geographic relevance score for the candidate answer based at least in part on a comparison of the one or more first geographic foci for the received input question and the one or more second geographic foci for the candidate answer to improve answer accuracy of the information handling system by making use of location information in the input question to generate the geographic relevance score for the candidate answer;
   training, by the information handling system, a statistical model on performance of a reasoning algorithm at establishing an inference between two similar passages for a particular domain during a training period; and
   weighting, by the information handling system, the geographic relevance score for the candidate answer against the statistical model to determine a level of confidence that the candidate answer is inferred by the input question.

2. The method of claim 1, where analyzing the input question comprises identifying and resolving each definite locative expression in the input question with respect to the geographical contextual information for the input question to identify the one or more first geographic foci of the input question.

3. The method of claim 2, further comprising:
   ranking, by the information handling system, the candidate answer against one or more additional candidate answers based on the geographic relevance score to generate a ranked list of candidate answers; and
   outputting, by the information handling system, a final answer from the ranked list of candidate answers having a highest geographic relevance score, thereby improving answer accuracy of the information handling system by making use of location information in the input question when generating the final answer.

4. The method of claim 1, where identifying the geographical contextual information for the candidate answer comprises identifying, for each document containing the candidate answer, a location of document publication, a location of document ingestion, a known focus location for a source of the document, or a creation location of the document.

5. The method of claim 1, where identifying geographical contextual information for the input question comprises identifying a location of primary interest in a profile for a user who submitted the input question.

6. The method of claim 1, where identifying one or more second geographic foci for the candidate answer comprises:
   identifying, by the information handling system, document location information associated with a corpus document; and
   associating, by the information handling system, each token in the corpus document with the document location information associated with the corpus document.

7. The method of claim 6, where identifying document location information comprises analyzing, by the information handling system, the corpus document to determine a document relevance location based on at least one of metadata or content of the corpus document.

8. The method of claim 7, where identifying document location information further comprises associating, with each definite locative expression contained in the corpus document, a location with the definite locative expression so that the one or more second geographic foci for the candidate answer is generated based on at least one of the document relevance location or the location of the definite locative expression.

9. The method of claim 1, where generating the geographic relevance score comprises:
  analyzing, by the information handling system, the input question to categorize the input question as location-non-monotonic or location-upward-monotonic; and
  scoring the candidate answer with a first geographic relevance score based on whether the one or more first geographic foci for the received input question geographically matches or includes the one or more second geographic foci for the candidate answer.

10. A computer program product comprising a computer readable storage medium having a computer readable program stored therein, wherein the computer readable program, when executed on an information handling system, causes the system to score candidate answers for geographic relevance by:
  receiving an input question for answering by the system;
  analyzing the input question to identify one or more first geographic foci of the input question by using a processor to identify geographical contextual information for the input question which is used to identify and normalize all definite locative expressions in the input question with respect to the geographical contextual information for the input question, thereby generating and storing the first geographic foci of the input question in memory;
  processing a corpus of documents using cognitive analysis comprising natural language processing and machine learning to generate a candidate answer to the input question;
  identifying one or more second geographic foci for the candidate answer by using the processor to identify geographical contextual information for the candidate answer which is used to identify and normalize all definite locative expressions in the candidate answer with respect to the geographical contextual information for the candidate answer, thereby generating the second geographic foci of the input question;
  generating a geographic relevance score for the candidate answer based at least in part on a comparison of the one or more first geographic foci for the received input question and the one or more second geographic foci for the candidate answer to improve answer accuracy of the information handling system by making use of location information in the input question to generate the geographic relevance score for the candidate answer;
  training, using the processor, a statistical model on performance of a reasoning algorithm at establishing an inference between two similar passages for a particular domain during a training period; and
  weighting, using the processor, the geographic relevance score for the candidate answer against the statistical model to determine a level of confidence that the candidate answer is inferred by the input question.

11. The computer program product of claim 10, wherein the computer readable program, when executed on the system, causes the system to analyze the input question by identifying and resolving each definite locative expression in the input question with respect to the geographical contextual information for the input question to identify the one or more first geographic foci of the input question.

12. The computer program product of claim 11, wherein the computer readable program, when executed on the system, causes the system to:
  rank the candidate answer against one or more additional candidate answers based on the geographic relevance score to generate a ranked list of candidate answers; and
  output a final answer from the ranked list of candidate answers having a highest geographic relevance score, thereby improving answer accuracy of the information handling system by making use of location information in the input question when generating the final answer.

13. The computer program product of claim 11, wherein the computer readable program, when executed on the system, causes the system to generate the geographic relevance score by:
  analyzing the input question to categorize the input question as location-non-monotonic or location-upward-monotonic; and
  scoring the candidate answer with a first geographic relevance score based on whether the one or more first geographic foci for the received input question geographically matches or includes the one or more second geographic foci for the candidate answer.

14. The computer program product of claim 10, wherein the computer readable program, when executed on the system, causes the system to identify the geographical contextual information for the input question by identifying a current location of a user who submitted the input question.

15. The computer program product of claim 10, wherein the computer readable program, when executed on the system, causes the system to identify the geographical contextual information for the input question by identifying a location of primary interest in a profile for a user who submitted the input question.

16. An information handling system comprising:
  one or more processors;
  a memory coupled to at least one of the processors;
  a set of instructions stored in the memory and executed by at least one of the processors to score candidate answers for geographic relevance, wherein the set of instructions are executable to perform actions of:
  analyzing, by the system, the input question to identify one or more first geographic foci of the input question by using the one or more processors to identify geographical contextual information for the input question which is used to identify and normalize all definite locative expressions in the input question with respect to the geographical contextual information for the input question, thereby generating and storing the first geographic foci of the input question in memory;
  processing, by the system, a corpus of documents using cognitive analysis comprising natural language processing and machine learning to generate a candidate answer to the input question;
  identifying, by the system, one or more second geographic foci for the candidate answer by using the processor to identify geographical contextual information for the candidate answer which is used to identify and normalize all definite locative expressions in the candidate answer with respect to the geographical contextual information for the candidate answer, thereby generating the second geographic foci of the input question;
  generating, by the system, a geographic relevance score for the candidate answer based at least in part on a comparison of the one or more first geographic foci for the received input question and the one or more second geographic foci for the candidate answer to improve answer accuracy of the information handling system by making use of location information in the input question to generate the geographic relevance score for the candidate answer;

training, by the system, a statistical model on performance of a reasoning algorithm at establishing an inference between two similar passages for a particular domain during a training period; and weighting, by the system, the geographic relevance score for the candidate answer against the statistical model to determine a level of confidence that the candidate answer is inferred by the input question.

17. The information handling system of claim 16, wherein analyzing the input question comprises identifying and resolving each definite locative expression in the input question with respect to the geographical contextual information for the input question to identify the one or more first geographic foci of the input question.

18. The information handling system of claim 16, wherein the geographical contextual information for the input question is identified from a current location of a user who submitted the input question.

19. The information handling system of claim 16, wherein the geographical contextual information for the input question is identified from a location of primary interest in a profile for a user who submitted the input question.

20. The information handling system of claim 17, wherein identifying one or more second geographic foci for the candidate answer comprises analyzing, by the system, a first document used to generate the candidate answer to identify specified document location data selected from a group consisting of a publication location for the first document, a source location for the first document, a creation location for the first document, an ingestion location for the first document, and a definite locative expression contained in the first document.

* * * * *